United States Patent
Kakiuchi et al.

(10) Patent No.: US 8,915,309 B2
(45) Date of Patent: Dec. 23, 2014

(54) DUST COLLECTING DEVICE AND ELECTRIC TOOL EQUIPPED WITH DUST COLLECTING DEVICE

(75) Inventors: Yasuhiro Kakiuchi, Anjo (JP); Yoshitaka Machida, Anjo (JP)

(73) Assignee: Makita Corporation, Anjo-shi (JP)

( * ) Notice: Subject to any disclaimer, the term of this patent is extended or adjusted under 35 U.S.C. 154(b) by 436 days.

(21) Appl. No.: 13/029,468

(22) Filed: Feb. 17, 2011

(65) Prior Publication Data

US 2011/0226499 A1 Sep. 22, 2011

(30) Foreign Application Priority Data

Mar. 16, 2010 (JP) .................................. 2010-059702

(51) Int. Cl.
*B25D 17/14* (2006.01)
*B25F 5/00* (2006.01)
*B23Q 11/00* (2006.01)

(52) U.S. Cl.
CPC .................................. *B23Q 11/0046* (2013.01)
USPC ............. 173/198; 173/217; 173/171; 408/67; 408/110

(58) Field of Classification Search
USPC ............ 173/75, 198, 217, 171; 451/344, 358, 451/359, 451, 456; 408/67, 110
See application file for complete search history.

(56) References Cited

U.S. PATENT DOCUMENTS

| | | | | |
|---|---|---|---|---|
| 4,192,390 A | * | 3/1980 | Wanner et al. .................. 173/75 |
| 4,841,929 A | * | 6/1989 | Tuggle et al. ............. 123/198 E |
| 5,349,752 A | * | 9/1994 | Stirm .............................. 30/124 |
| 5,467,835 A | * | 11/1995 | Obermeier et al. ........... 175/209 |
| 6,514,131 B1 | * | 2/2003 | Reich et al. .................... 451/344 |
| 6,575,254 B2 | * | 6/2003 | Bongers-Ambrosius et al. ............................. 173/201 |
| 6,641,634 B2 | * | 11/2003 | Reich et al. ................. 55/385.1 |
| 6,841,898 B2 | * | 1/2005 | Moran ............................ 307/80 |
| 7,017,680 B2 | * | 3/2006 | Arich et al. ................... 173/198 |
| 7,354,226 B2 | * | 4/2008 | Britz .............................. 408/67 |
| 7,909,114 B2 | * | 3/2011 | Nishikawa et al. ............. 173/75 |
| 8,070,845 B2 | * | 12/2011 | Roehm ....................... 55/385.1 |
| 8,197,310 B2 | * | 6/2012 | Yamashiro et al. ........... 451/453 |
| 2002/0141836 A1 | | 10/2002 | Ege et al. |
| 2002/0152731 A1 | | 10/2002 | Reich et al. |
| 2004/0002296 A1 | | 1/2004 | Reich et al. |
| 2008/0202781 A1 | | 8/2008 | Nishikawa et al. |

FOREIGN PATENT DOCUMENTS

| | | |
|---|---|---|
| CA | 2090254 A1 | 8/1993 |
| EP | 1 245 330 A2 | 10/2002 |
| JP | A-2002-307332 | 10/2002 |
| JP | A-2003-500227 | 1/2003 |
| JP | A-2005-335060 | 12/2005 |

(Continued)

OTHER PUBLICATIONS

Jul. 7, 2011 Search Report issued in European Patent Application No. 11 155 961.3.

(Continued)

*Primary Examiner* — Scott A. Smith
(74) *Attorney, Agent, or Firm* — Oliff PLC

(57) ABSTRACT

A dust box joined to a dust collecting device is formed of a box body, and a lid body that is joined to the box body by a hinge and can open and close an opening of the box body, and a main filter and a pre-filter are attached to the lid body.

12 Claims, 9 Drawing Sheets

(56) References Cited

FOREIGN PATENT DOCUMENTS

| | | |
|---|---|---|
| JP | A-2008-207361 | 9/2008 |
| JP | A-2008-229850 | 10/2008 |
| JP | A-2009-012395 | 1/2009 |
| JP | A-2009-539627 | 11/2009 |
| WO | WO 01/58642 A1 | 8/2001 |
| WO | WO 03/026848 A1 | 4/2003 |

OTHER PUBLICATIONS

Oct. 8, 2013 Office Action issued in Japanese Application No. 2010-059702 (with English translation).
Apr. 22, 2014 Office Action issued in Japanese Patent Application No. 2010-059702 (with translation).
Jan. 21, 2014 Office Action issued in Japanese Patent Application No. 2010-059702 (with translation).

* cited by examiner

DUST COLLECTING DEVICE AND ELECTRIC TOOL EQUIPPED WITH DUST COLLECTING DEVICE

This application claims the benefit of the Japanese Patent Application No. 2010-059702 filed on Mar. 16, 2010, the entirety of which is incorporated by reference in its entirety.

BACKGROUND OF THE INVENTION

1. Field of the Invention

The present invention relates to a dust collecting device with electric tools, such as electric drill or hammer drill, and an electric tool with a dust collecting device.

2. Description of the Related Art

An electric tool, such as an electric drill or a hammer drill, has a dust collecting device to gather powder dust produced from workpieces during drilling operations. Such a dust collecting device is disclosed in Japanese Patent Application Publication No. JP-A-2008-207361. In the disclosure, a hose connected to an adapter penetrated by a tip tool is connected to a dust collecting housing provided on an electric tool side. An opening portion communicating with a hose connection side and an opening portion communicating with a side of a dust collecting fan provided on a motor output shaft of the electric tool are formed through the dust collecting housing. Meanwhile, a dust collecting case removably joined to the dust collecting housing is provided with a filter, and an inlet and an outlet that communicate with each other inside across the filter. The inlet and the outlet are provided in the same direction (on the same joint face) of the dust collecting case. As a result, the dust collecting case is positioned in one direction with respect to the dust collecting housing and is easily joined thereto.

However, the aforementioned dust collecting device described in Japanese Patent Application Publication No. 2008-207361 has the filter fixed in the dust collecting case. Therefore, it is difficult to discard the powder dust accumulating in the dust collecting case. Further, it is also troublesome and time-consuming to clean the filter itself.

SUMMARY OF THE INVENTION

It is therefore an object of the present invention to provide a dust collecting device and an electric tool equipped with the dust collecting device that make it easy to discard powder dust from a dust collecting case (a dust box) and clean a filter.

In order to achieve the above-stated object, according to a first aspect of the present invention, there is provided a dust collecting device that includes a casing that forms a dust collecting route, through which outside air sucked from a suction port flows, and can be mounted to an electric tool, and a dust box that is removably joined to a joint portion provided on the casing and is provided therein with a vent channel equipped with a filter and constituting part of the dust collecting route. In this dust collecting device, the dust box includes a box body and a lid body joined by a hinge to the box body and being able to open and close an opening of the box body, and the filter is attached to the lid body.

In the construction of the foregoing first aspect of the present invention, the filter may be removable from the lid body.

In the aforementioned construction, the filter may be composed of two filters, namely, a main filter and a pre-filter located on an upstream side of the main filter, and both the filters may be attached via an attachment member assembled with the lid body.

Besides, it is desirable that the pre-filter is formed in a shape of a bag covering the main filter from an upstream side, or that the lid body be provided, at an edge thereof opposite the hinge, with a stopper strip that elastically engages an engagement protrusion provided on the box body when the lid body is closed.

In order to achieve the above-stated object, according to a second aspect of the present invention, there is provided an electric tool equipped with a dust collecting device that includes a housing to which the dust collecting device according to the first aspect of the present invention is mounted.

According to the first and second aspect of the present invention, since the opening is provided in the lid body, it is easy to discard powder dust from the dust box and clean the filter. As a result, usability is improved.

Further, the filter is configured to be removable from the lid body, greater convenience is achieved in cleaning or replacing the filter, in addition to the effect of the first aspect of the present invention.

In addition to the aforementioned effects, the life of the main filter is prolonged. Further, the pre-filter can be removed from the lid body together with the main filter with ease.

DETAILED DESCRIPTION OF THE EMBODIMENT

An embodiment of the present invention will be described hereinafter on the basis of the drawings.

[Construction of Hammer Drill]

Figure 1:
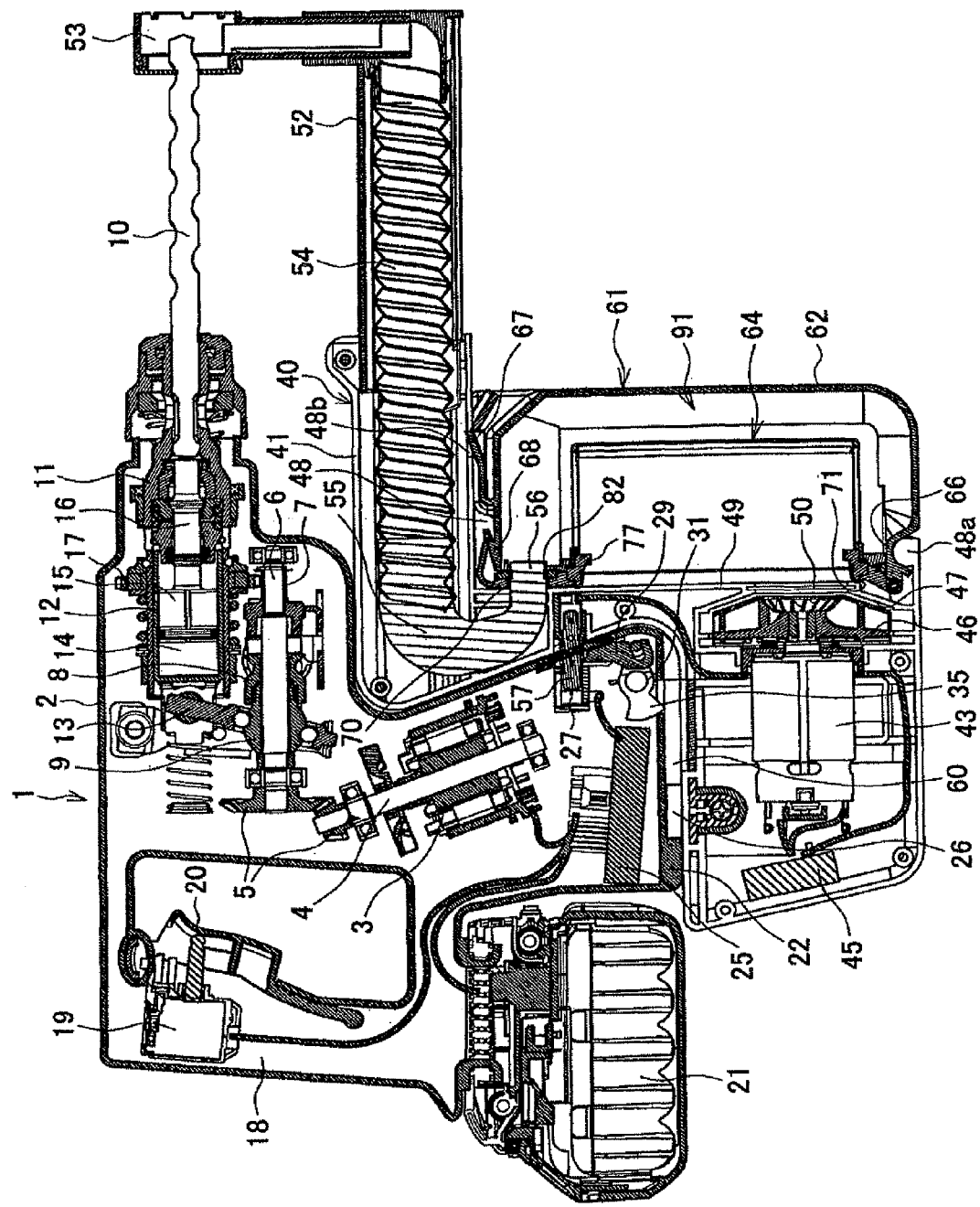
FIG. 1 is a longitudinal sectional view of a hammer drill to which a dust collecting device is mounted.
Figure 2:
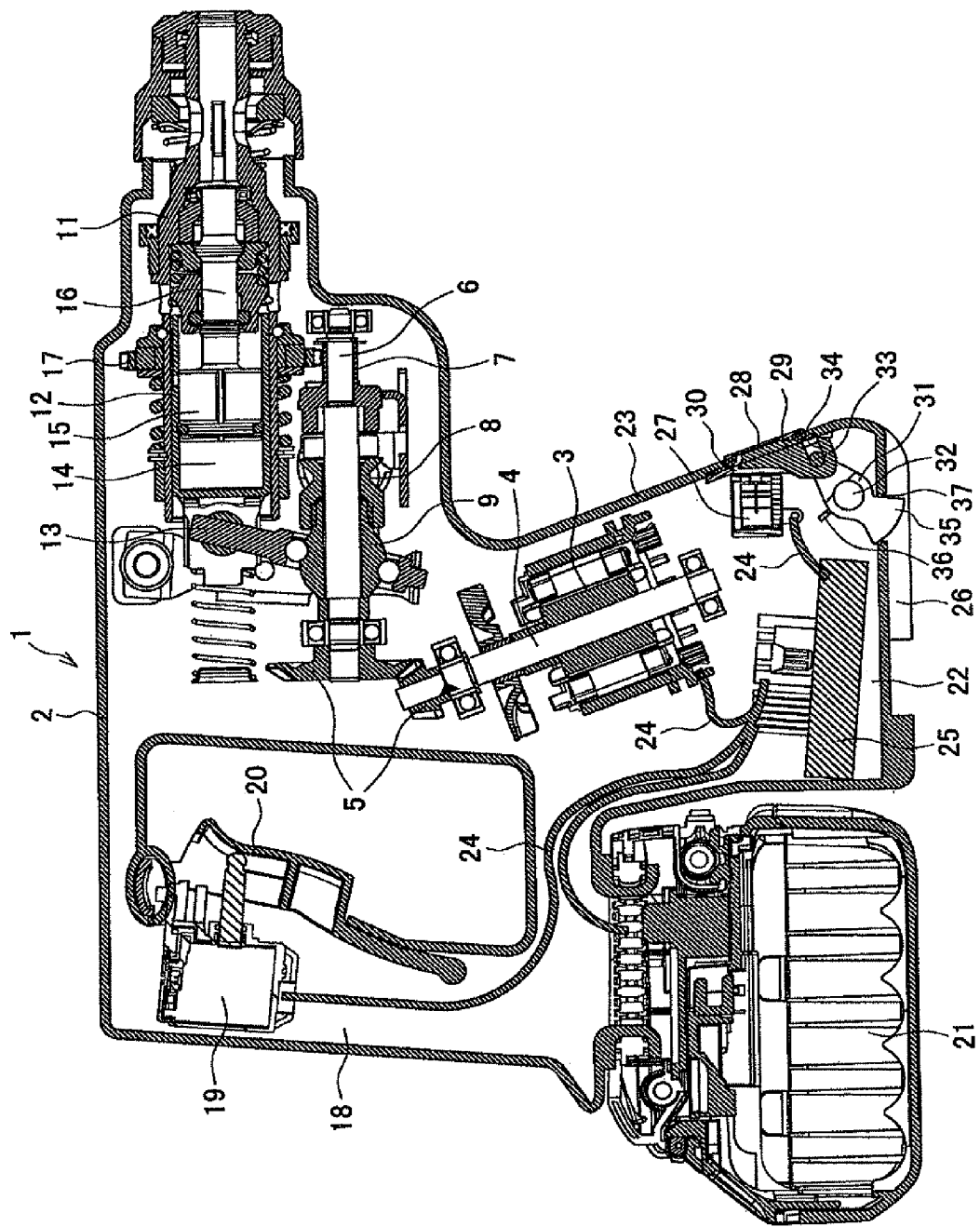
FIG. 2 is a longitudinal sectional view of the hammer drill.

FIG. 1 shows a state in which a dust collecting device is mounted to a hammer drill as an example of an electric tool, and FIG. 2 shows the hammer drill alone. First of all, a hammer drill 1 accommodates a motor 3 at a center of a housing 2, which is constructed by assembling a pair of right and left half housings with each other, on a front side thereof (the right side of FIGS. 1 and 2 is defined as the front side), with an output shaft 4 in a backward inclined posture. The hammer drill 1 is equipped with a first gear 7, a clutch 8, and a boss sleeve 9, which are arranged in this order from the front side on an intermediate shaft 6 to which torque is transmitted via bevel gears 5 and 5 above the output shaft 4. A tool holder 11 having a tip to which a bit 10 can be inserted and fitted is axially supported parallel to the intermediate shaft 6 thereabove. An arm 13 sheathed with a boss sleeve 9 via a swash bearing is coupled to a rear end of a piston cylinder 12 loosely inserted in a rear portion of the tool holder 11. Fitted inside the piston cylinder 12 is a striker 15 that can longitudinally move via an air chamber 14 and hence can strike an impact bolt 16 provided in front of the striker 15. The first gear 7 is meshed with a second gear 17 mounted to the tool holder 11.

On the other hand, a handle 18 equipped with a switch 19 and a switch lever 20 is formed in an upper-rear portion of the housing 2, and a battery pack 21 serving as a power supply is mounted below the handle 18. Further, a lower-front portion of the housing 2 constitutes a mounting portion 22 to which a dust collecting device 40 is mounted. A front face of the mounting portion 22 is an inclined face portion 23 parallel to the output shaft 4 and protrudes forward from the battery pack 21. This mounting portion 22 accommodates therein a controller 25 electrically connected to a coil of the motor 3, the switch 19, and the battery pack 21 by lead wires 24, 24, ... and a guide groove 26 whose front end opens forward is provided in a recessed manner longitudinally in a lower face of the mounting portion 22. Further, positive and negative female terminals 27, which are electrically connected to positive and negative male terminals 57 on the dust collecting device 40 side, are provided in front of the controller 25 and electrically connected by the lead wires 24 respectively.

A rectangular plug-in port 28 is formed open in front of the female terminals 27 on the inclined face portion 23, and a shutter 29 for opening and closing the plug-in port 28 is provided inside the mounting portion 22. This shutter 29 has a front face as an inclined face corresponding to the inclined face portion 23, and is designed as a plate body whose thickness decreases in the course of extending upward. The shutter 29 is vertically movably supported between a closed position of the plug-in port 28 and an open position of the plug-in port 28 by seats 30 provided protrusively vertically on inner faces of right and left half housings respectively. Further, a rotary link 31 is provided behind the shutter 29 on a lower portion of the mounting portion 22. This rotary link 31 has a center supported by a lateral shaft 32 rotatably in the mounting portion 22. A pin 33 laterally provided at a front end of the rotary link 31 is loosely inserted in an inclined groove 34 provided in a lower portion of the shutter 29 and inclined downward and backward. Meanwhile, a fan-shaped cam portion 35 is formed at the other end of the rotary link 31. Further, the rotary link 31 is rotationally urged in a left rotational direction in FIG. 2 by a torsion spring 36. In a normal state, while the cam portion 35 is protruded into the guide groove 26 via a permeable hole 37 provided through a bottom portion of the mounting portion 22, the shutter 29 is pressed up by the pin 33 and held at the closed position of the plug-in hole 28.

[Construction of Dust Collecting Device]

Figure 3:
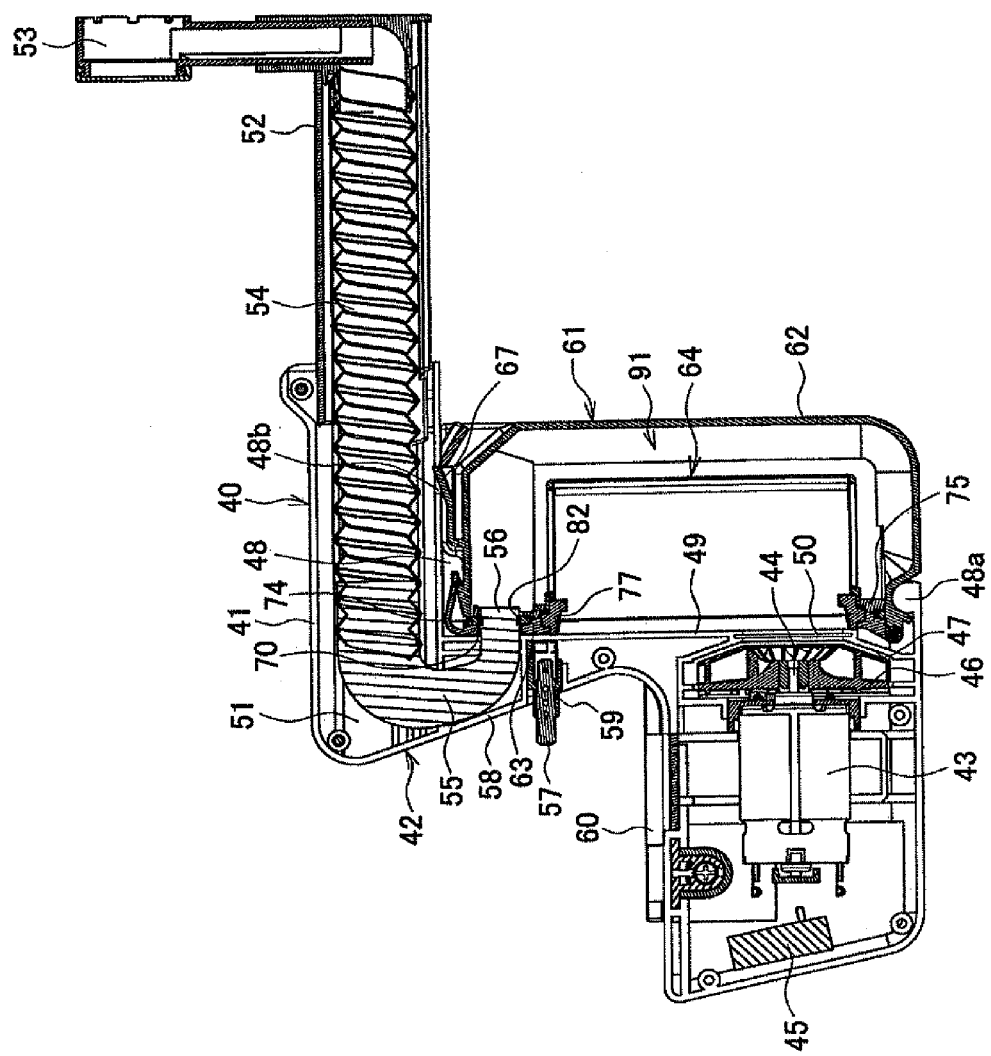
FIG. 3 is a longitudinal sectional view of the dust collecting device.

As shown in FIG. 3 as well, the dust collecting device 40 is equipped with a fitting recess portion 42 that abuts on and is fitted to a bottom face and the inclined face portion 23 of the mounting portion 22 of the hammer drill 1, and has a casing 41 that is in an inverse L shape in a lateral view and is constructed by assembling right and left half casings with each other. A motor 43 having an output shaft 44 directed forward is laterally accommodated behind the casing 41, and a controller 45 is provided behind the motor 43. Further, a dust collecting fan 46 is securely attached to the output shaft 44, and accommodated in an intake chamber 47 that is partitioned in the casing 41 and equipped with an exhaust port (not shown) formed in a lateral face thereof. A joint portion 48 of a dust box 61 formed on the casing 41 in front of the intake chamber 47 is denoted by 48 and formed in the shape of a recess opening only forward. A communication hole 50 through which the joint portion 48 communicates with the intake chamber 47 on the same axis of the dust collecting fan 46 is formed in a partition wall 49 serving as a bottom of the joint portion 48.

On the other hand, a guide passage 51 having an open front end and a rear end that turns in a U shape and extends to a region behind the joint portion 48 is formed longitudinally above the joint portion 48. An L-shaped nozzle 52 is coupled to the front end of the guide passage 51, and a tip of the nozzle 52 having a suction port 53 is protruded upward. This nozzle 52 and this guide passage 51 accommodate a flexible hose 54 extending along both thereof. A rectangular cylindrical duct 55 bent back in a U shape along the shape of a rear end of the guide passage 51 is coupled to a rear end of the flexible hose 54. A tip portion 56 of the duct 55 penetrates the partition wall 49 and protrudes into the joint portion 48.

Further, a pair of the positive and negative male terminals 57 is provided behind the joint portion 48. These male terminals 57 are plate bodies that are securely plugged in an inclined rear face 58 of the casing 41, which forms the fitting recess portion 42, and protrude backward. The casing 41 is provided with a protection rib 59 that is fixed along intermediate regions of the male terminals 57 and has a tip protruding backward. Accordingly, protruding root regions of the male terminals 57 are protected by the protection rib 59. Furthermore, a rail 60 fitted in the guide groove 26 provided in the lower face of the mounting portion 22 of the hammer drill 1 is longitudinally protrusively provided on an upper rear face of the casing 41 which forms the fitting recess portion 42.

Figure 4:
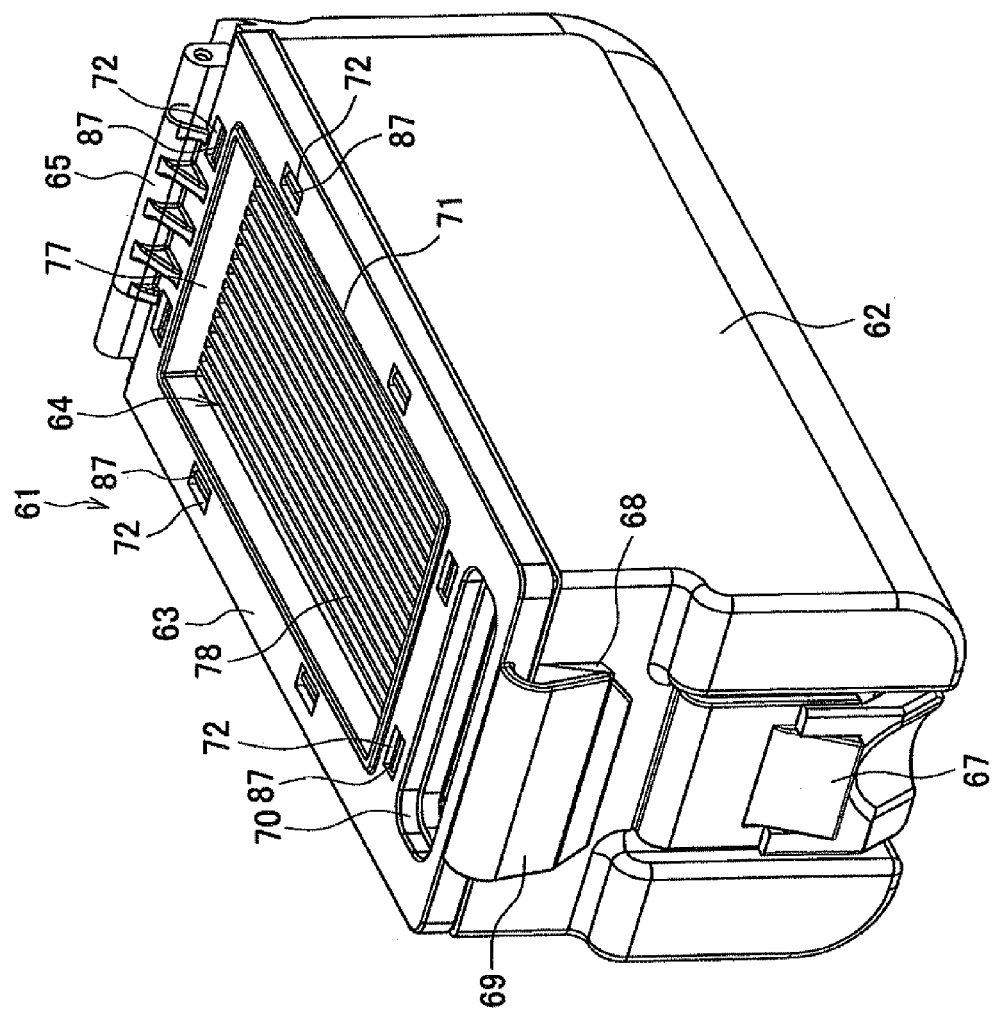
FIG. 4 is a perspective view of a dust box.
Figure 5:
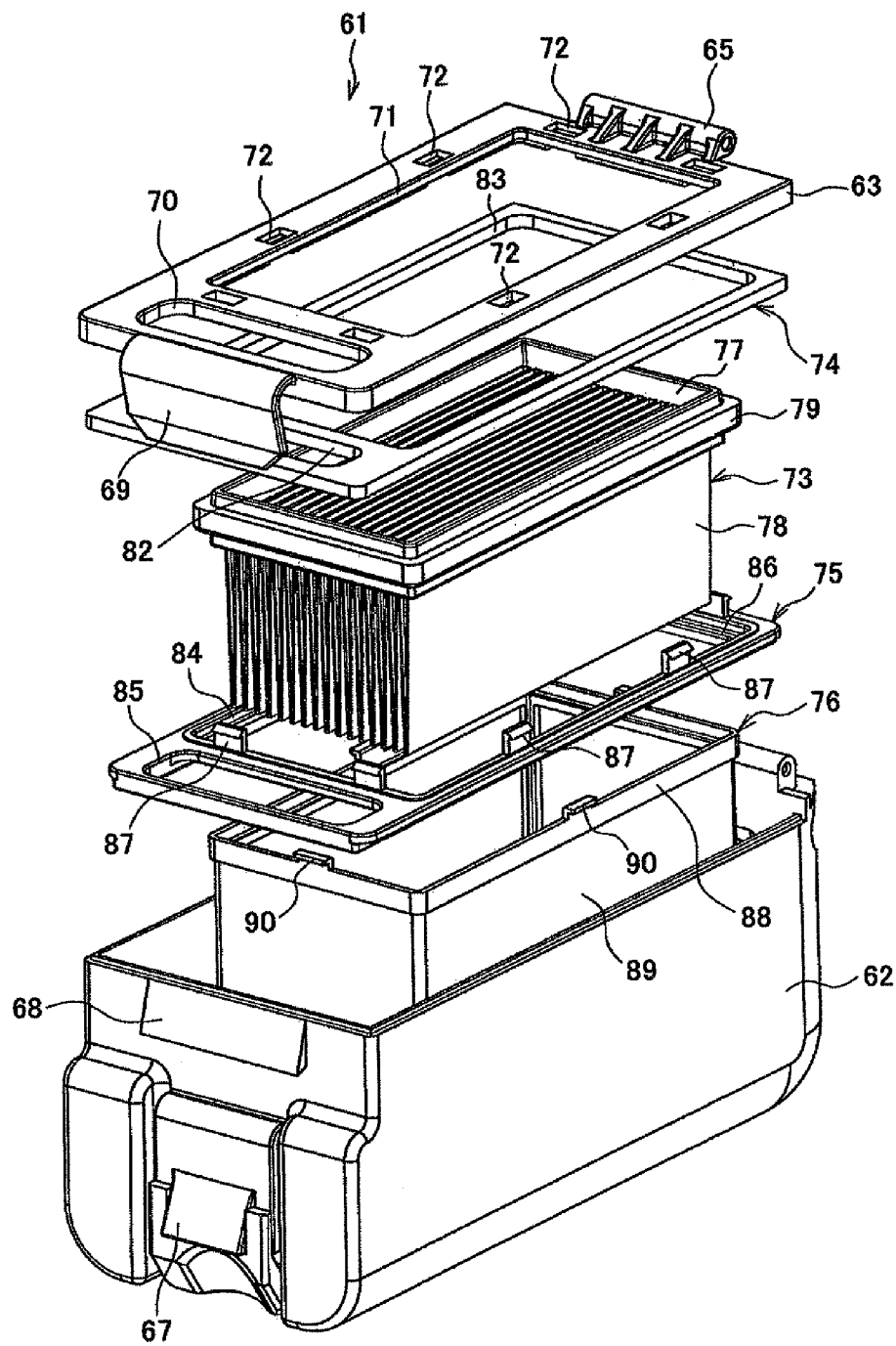
FIG. 5 is an exploded perspective view of the dust box.
Figure 6:
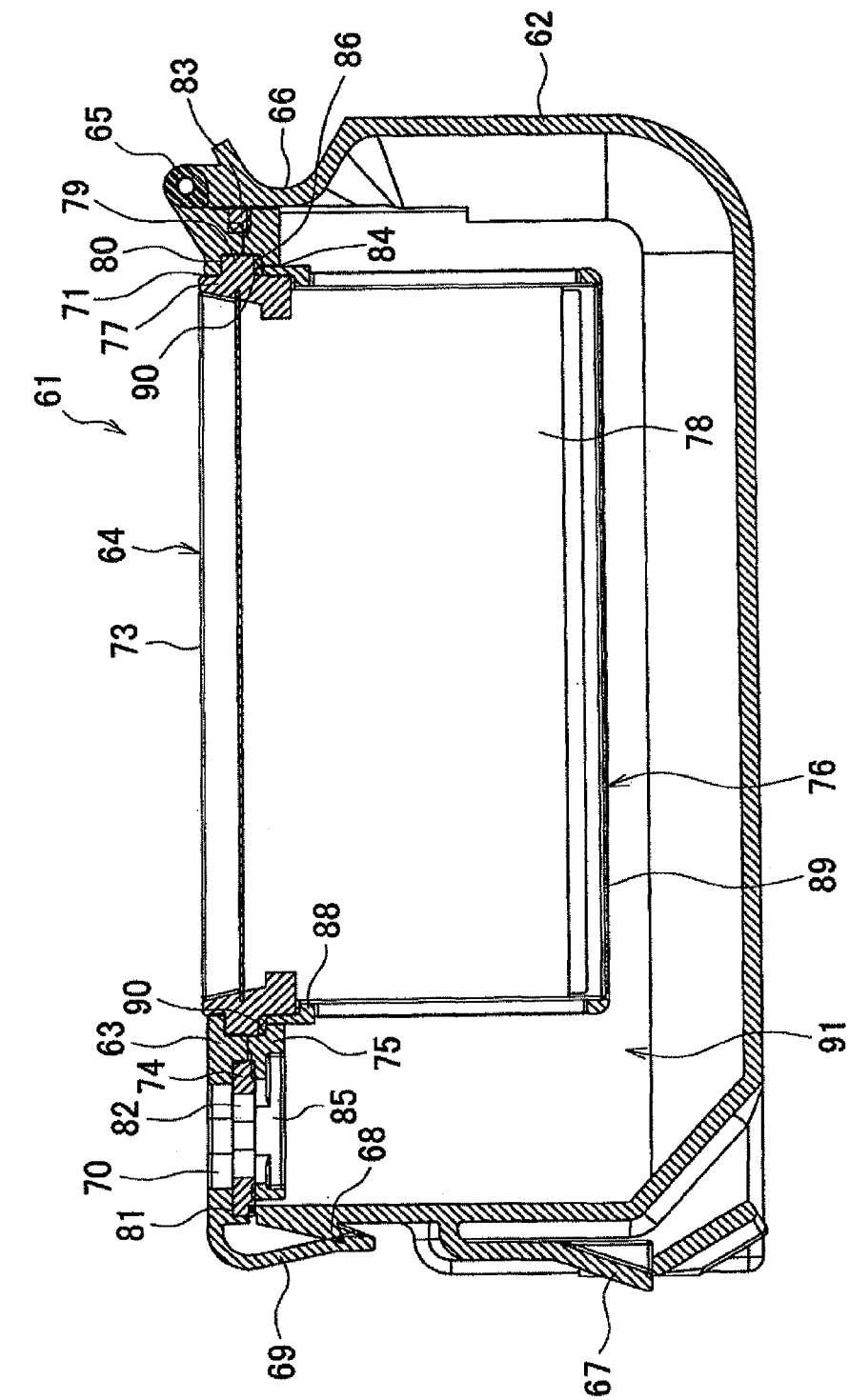
FIG. 6 is a longitudinal sectional view of the dust box.

The dust box 61 is mounted to the joint portion 48. As shown in FIGS. 4 to 6, this dust box 61 is equipped with a box body 62 in which powder dust is trapped, a lid body 63 joined to the box body 62 by a hinge 65, and a filter unit 64 joined to the lid body 63.

First of all, the box body 62 is a longitudinal boxlike body having an open upper face. The box body 62 is equipped, in a short lateral face thereof on the hinge 65 side, with a recess groove 66 in which a lateral shaft protrusion 48*a* provided protrusively on a lower inner face of the joint portion 48 is fitted, and is equipped, in the other short lateral face thereof, with a tongue-like engagement strip 67 that is directed downward and elastically engages a permeable hole 48*b* drilled through an upper inner face of the joint portion 48, and with an engagement protrusion 68 that is provided protrusively on an opening edge above the engagement strip 67 and protrudes more and more outward in the course of extending downward.

The lid body 63 is a rectangular plate capable of closing an opening in an upper face of the box body 62. A stopper strip 69 that elastically engages the engagement protrusion 68 of the box body 62 when the lid body 63 is closed is provided protrusively downward at an end edge of the lid body 63 on the other side of the hinge 65. Further, a rectangular inlet 70 that is penetrated by a tip portion 56 of the duct 55 when the dust box 61 is mounted to the joint portion 48 is drilled through the lid body 63 in a region thereof close to the stopper strip 69. A rectangular outlet 71 that is opposed to the communication hole 50 also when the dust box 61 is mounted to the joint portion 48 is provided between the inlet 70 and the hinge 65. Pairs of attachment holes for the filter unit 64, which are denoted by 72 and 72, are drilled along each side of the outlet 71 on the outside thereof.

The filter unit 64 is equipped with a main filter 73 and a pre-filter 76, and is assembled with the lid body 63 via a sealing body 74 and an attachment plate 75 from below the lid body 63.

First of all, the main filter 73 is constructed by attaching a filter 78 made of a folded sheet of paper to an outlet frame 77 fitted to the outlet 71 of the lid body 63 from below. As shown in FIG. 6, the main filter 73 is positioned with respect to the outlet 71 by fitting a protrusion strip 79 provided circumferentially on an outer face of the outlet frame 77 to an upper stage portion 80 formed along a lower edge of the outlet 71 of the lid body 63.

The sealing body 74 is a plate body that is positioned by being fitted in a recess portion 81 formed in the lower face of the lid body 63 and is made of an elastic material such as rubber or the like. The sealing body 74 is equipped with a rectangular sealing port 82 that is located below the inlet 70 of the lid body 63 and is substantially smaller than the inlet 70, and with a rectangular sealing frame 83 that abuts on the lid body 63 along a peripheral edge thereof.

The attachment plate 75 as an attachment member is a rectangular plate member slightly smaller than the lid body 63, and is equipped with two through-holes, namely, a large through-hole 84 and a small through-hole 85 that open downward both the inlet 70 and the outlet 71 of the lid body 63 respectively in accordance therewith. A lower stage portion 86 to which the protrusion strip 79 of the outlet frame 77 of the main frame 73 is fitted is formed on an upper edge of the large through-hole 84. Further, engagement protrusions 87 each equipped at an upper end thereof with an outward return are formed correspondingly to the attachment holes 72 of the lid body 63 on an upper face of the attachment plate 75 around the through-hole 84. The engagement protrusions 87 can be inserted into the attachment holes 72 so as to be engaged respectively while receiving the outlet frame 77 of the main filter 3 via the sealing body 74. Furthermore, those three sides of the attachment plate 75 which are not located on the hinge 65 side are all located inside the sealing body 74. When the lid body 63 is closed, the sealing frame 83 directly abuts on the opening of the box body 62.

The pre-filter 76 is constructed by attaching a bag-shaped filter 89 to a frame body 88. The frame body 88 is fitted from below between the outlet frame 77 of the main filter 73 and the through-hole 84 of the attachment plate 75. The filter 89 is made of a cloth coarser than the filter 78 of the main filter 73. Hook strips 90 in an inverse L shape and having tips directed outward are provided protrusively on centers of respective sides of the frame body 88. These hook strips 90 can engage the lower stage portion 86 of the attachment plate 75 below the protrusion strip 79 of the outlet frame 77.

It should be noted that the components mentioned herein, namely, the box body 62, the lid body 63, the outlet frame 77 of the main filter 73, the attachment plate 75, and the frame body 88 of the pre-filter 76 are formed of synthetic resin respectively.

[Assembly of Dust Collecting Device and Mounting Thereof to Hammer Drill]

In the dust collecting device 40 constructed as described above, when the pre-filter 76 is first inserted from above into the through-hole 84 of the attachment plate 75, the hook strips 90 of the frame body 88 engage the lower stage portion 86 of the through-hole 84, so that the pre-filter 76 is supported by being suspended from the attachment plate 75. Subsequently, the main filter 73 is inserted from above into the pre-filter 76 to fit the outlet frame 77 in the through-hole 84. Then, the protrusion strip 79 engages the lower stage portion 86, and the main filter 73 is supported by being suspended from the attachment plate 75 in the pre-filter 76. It should be noted that it is also appropriate to first insert the main filter 73 into the pre-filter 76 and then assemble both the filters with the attachment plate 75.

In this state, the sealing body 74 is set on the upper face of the attachment plate 75, and the lid body 63 is assembled from above the sealing body 74 while fittingly inserting the engagement protrusions 87 into the attachment holes 72 respectively. Then, as shown in FIG. 6, the protrusion strip 79 of the outlet frame 77 is sandwiched between the lid body 63 and the attachment plate 75, and the filter unit 64 is mounted to the lid body 63.

When the lid body 63 thus assembled with the filter unit 64 is closed, the stopper strip 69 elastically engages the engagement protrusion 68 of the box body 62, and the sealing body 74, which is fitted in the recess portion 81 and exposed around the peripheral edge of the lower face of the lid body 63, abuts on the opening of the box body 62 to seal the opening. Accordingly, a vent channel 91 through which the air that has entered the box body 62 from the inlet 70 of the lid body 63 is discharged from the outlet 71 after flowing through the pre-filter 76 and the main filter 73 is formed through the dust box 61.

Figure 7:
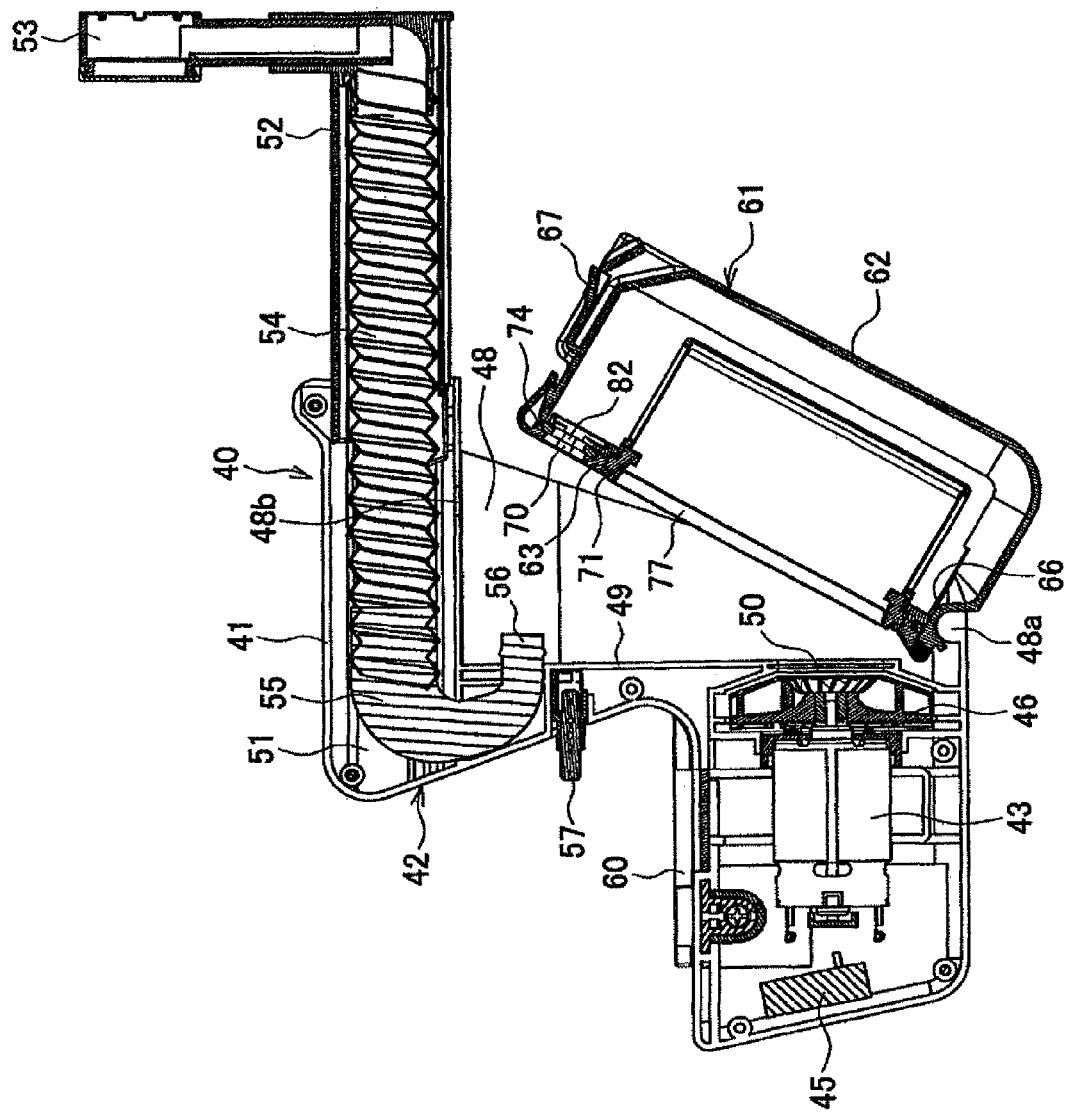
FIG. 7 is a longitudinal sectional view showing a joint state of the dust box.

In joining this dust box 61 to the dust collecting device 40, as shown in FIG. 7, the recess groove 66 of the box body 62 is first fitted to the shaft protrusion 48a of the joint portion 48, and the dust box 61 is immediately rotated backward around the shaft protrusion 48a to be pressed in until the upper face of the lid body 63 comes into abutment on the partition wall 49 of the joint portion 48. Then, as shown in FIG. 3, the engagement strip 67 of the box body 62 engages the permeable hole 48b of the joint portion 48. At the same time, the tip portion 56 of the duct 55 protruding from the joint portion 48 penetrates the inlet 70 of the lid body 63 and the sealing port 82 of the sealing body 74 and protrudes into the box body 62, and the communication hole 50 faces the outlet 71 of the lid body 63.

Due to the joining of this dust box 61, a dust collecting route extending from the suction port 53 of the nozzle 52 to the dust collecting fan 46 via the flexible hose 54, the duct 55, the vent channel 91 of the dust box 61, and the communication hole 50 is formed through the dust collecting device 40. It should be noted that since an inner edge of the sealing port 82 of the sealing body 74 abuts on the inlet 70 of the dust box 61 along the entire circumference of the tip portion 56 of the duct 55, the duct 55 and the vent channel 91 are connected to each other in a sealed state.

When mounting the dust collecting device 40 thus mounted with the dust box 61 to the hammer drill 1, the dust collecting device 40 is slid backward in such a manner as to fit the fitting recess portion 42 to the mounting portion 22 from before with the rail 60 of the dust collecting device 40 matched in position with the guide groove 26 in the lower face of the mounting portion 22 of the hammer drill 1. The rail 60 then slides backward in the guide groove 26, comes into abutment on the cam portion 35 of the rotary link 31 while sliding, and presses up the cam portion 35 to thereby rotate the rotary link 31 rightward in FIG. 2. Accordingly, the pin 33 pulls in the shutter 29 to a lower open position to open the plug-in port 28.

After that, the male terminals 57 of the dust collecting device 40 enter the housing 2 from the open plug-in port 28, and are inserted through the female terminals 27 and electrically connected thereto respectively as soon as the mounting portion 22 is fitted into the fitting recess portion 42 (FIG. 1).

[Operations of Hammer Drill and Dust Collecting Device]

When the switch 19 is turned on through pressing the switch lever 20 of the hammer drill 1, the motor 3 is driven to rotate the intermediate shaft 6. At this moment, the clutch 8 is operated in a sliding manner from outside the housing 2 to make a selection among a forward position where the clutch 8 is engaged only with the first gear 7, a backward position where the clutch 8 is engaged only with the boss sleeve 9, and an intermediate position where the clutch 8 is engaged with the first gear 7 and the boss sleeve 9 simultaneously. A selection among a drill mode in which the tool holder 11 rotates via the second gear 17 to rotate the bit 10, a hammer mode in which the piston cylinder 12 is moved in a reciprocating manner through the rocking of the arm 13 and the striker 15 interlocked with the piston cylinder 12 strikes the bit 10 via the impact bolt 16, and a hammer drill mode in which the tool holder 11 rotates and the impact bolt 16 strikes the bit 10 at the same time is made possible.

On the other hand, in response to the turning-on of the switch 19, the controller 25 supplies power to the controller 45 of the dust collecting device 40. Accordingly, the controller 45 drives the motor 43 to rotate the dust collecting fan 46. Thus, outside air is sucked from the suction port 53 of the nozzle 52, is discharged into the box body 62 from the inlet 70 through the flexible hose 54 and the duct 55, reaches the intake chamber 47 from the outlet 71 via the communication hole 50 after flowing through the vent channel 91, and is discharged to the outside from the exhaust port provided through the intake chamber 47. In consequence, the powder dust produced from workpieces by the rotating bit 10 is sucked into the suction port 53, enters the box body 62 via the nozzle 52, the flexible hose 54, and the duct 55, is captured by one of the pre-filter 76 and the main filter 73, and is trapped in the box body 62.

It should be noted that when the switch 19 is turned off by releasing the pressed-in switch lever 20, the motor 3 stops, and then the rotation of the bit 10 and the like stops. However, the controller 25 is endowed with a delay function for stopping the energization of the dust collecting device 40 with a delay of several seconds from a moment when the switch 19 is turned off. In the dust collecting device 40, therefore, the dust collecting fan 46 continues to rotate for several seconds after the bit is stopped. Accordingly, the powder dust remaining in the nozzle 52, the flexible hose 54, and the like can also be reliably gathered into the dust box 61.

Figure 8:
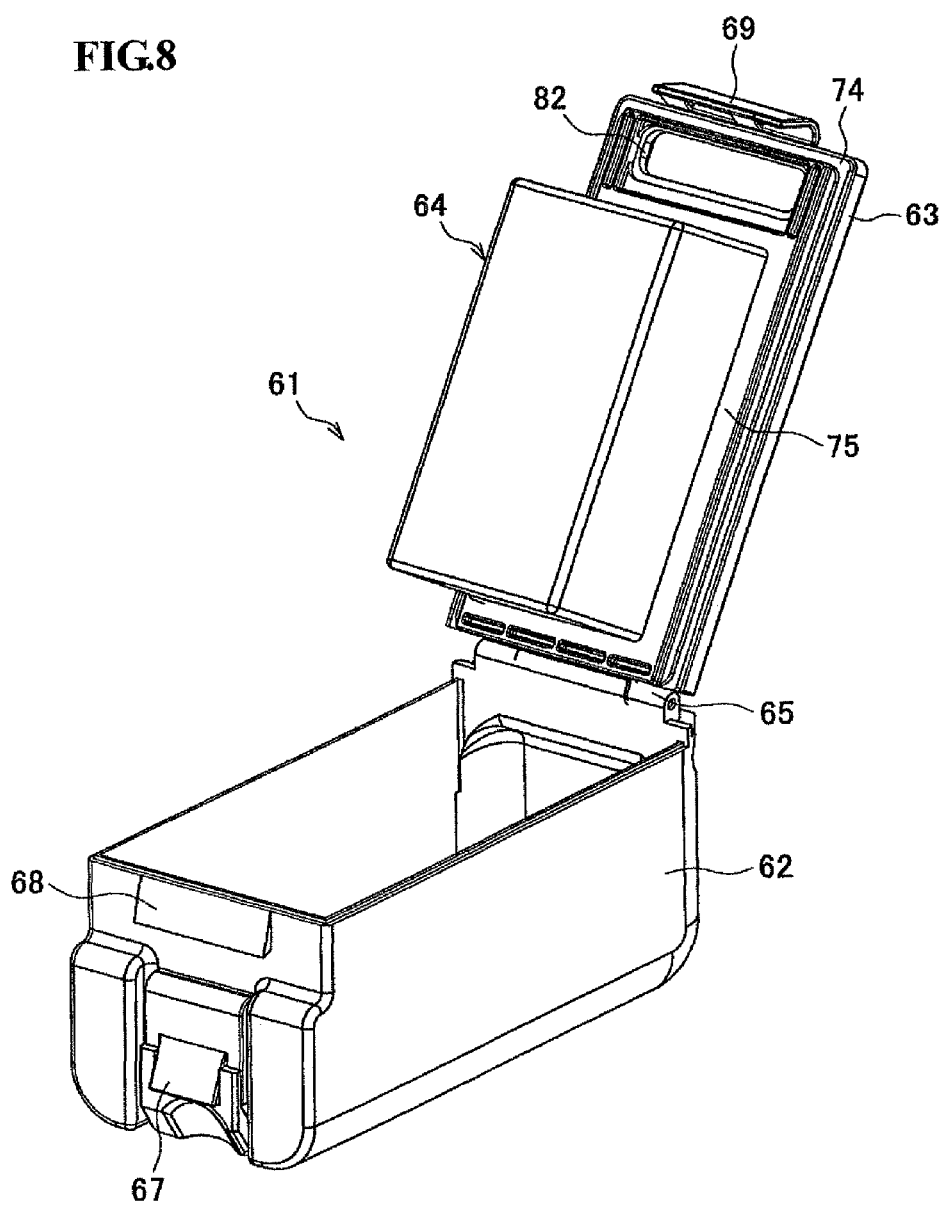
FIG. 8 is a perspective view of the dust box with a lid body open.

Then, when powder dust accumulates in the box body 62, the dust box 61 is rotated forward around the shaft protrusion 48a through an operation reverse to the mounting operation with the engagement strip 67 pressed down by a finger to be disengaged from the permeable hole 48b. Then, the tip portion 56 of the duct 55 is detached from the sealing port 82 and the inlet 70, and the dust box 61 can be immediately taken out. Then, when the stopper strip 69 of the lid body 63 is removed from the engagement protrusion 68 of the box body 62, the box body 62 can be opened by opening the lid body 63 as shown in FIG. 8. Therefore, the powder dust in the box body 62 can be discarded.

Further, when the attachment plate 75 is removed from the lid body 63, the filter unit 64 can be removed. Therefore, the main filter 73 and the pre-filter 76 can be cleaned and replaced with ease.

However, the respective sides of the frame body 88 of the pre-filter 76 exhibit elasticity. Therefore, only the pre-filter 76 can be removed from the filter unit 64 by drawing out the hook strips 90 engaged with the lower stage portion 86 of the attachment plate 75 from a space between the outlet frame 77 and the lower stage portion 86 respectively. Accordingly, it is possible, for example, to replace and clean the pre-filter 76 and clean the exposed main filter 73.

On the other hand, as for the removal of the dust collecting device 40, when the dust collecting device 40 is slid forward from the hammer drill 1 as opposed to the mounting of the dust collecting device 40, the guide groove 26 guides the rail 60 to thereby cause the dust collecting device 40 to slide forward. As the dust collecting device 40 slides forward, the male terminals 57 are separated from the female terminals 27 and drawn out from the plug-in port 28. After that, the rotary link 31 having the cam portion 35 that has been released from being pressed up by the advanced rail 60 is urged by the torsion spring 36 to rotate leftward, thus pressing the shutter 29 upward via the pin 33. Accordingly, the shutter 29 returns to the closed position and closes the plug-in port 28.

[Effect of Dust Collecting Device]

According to the dust collecting device 40 of the foregoing embodiment of the present invention, the dust box 61 is formed of the box body 62 and the lid body 63 that is joined to the box body 62 by the hinge and can open and close the opening of the box body 62, and the main filter 73 and the pre-filter 76 are attached to the lid body 63. Thus, the opening of the lid body 63 makes it easy to discard powder dust from the dust box 61 and clean the main filter 73 and the pre-filter 76. As a result, usability is improved.

Especially in this case, the main filter 73 and the pre-filter 76 are removable from the lid body 63. Therefore, greater convenience is achieved in cleaning or replacing both the filters 73 and 76.

Further, the two filters, namely, the main filter 73 and the pre-filter 76 located on an upstream side of the main filter 73 are provided. Both the filters 73 and 76 are attached via the attachment plate 75 assembled with the lid body 63. Thus, the life of the main filter 73 is prolonged, and the pre-filter 76 can be removed from the lid body 63 together with the main filter with ease.

Modification Example

Figure 9:
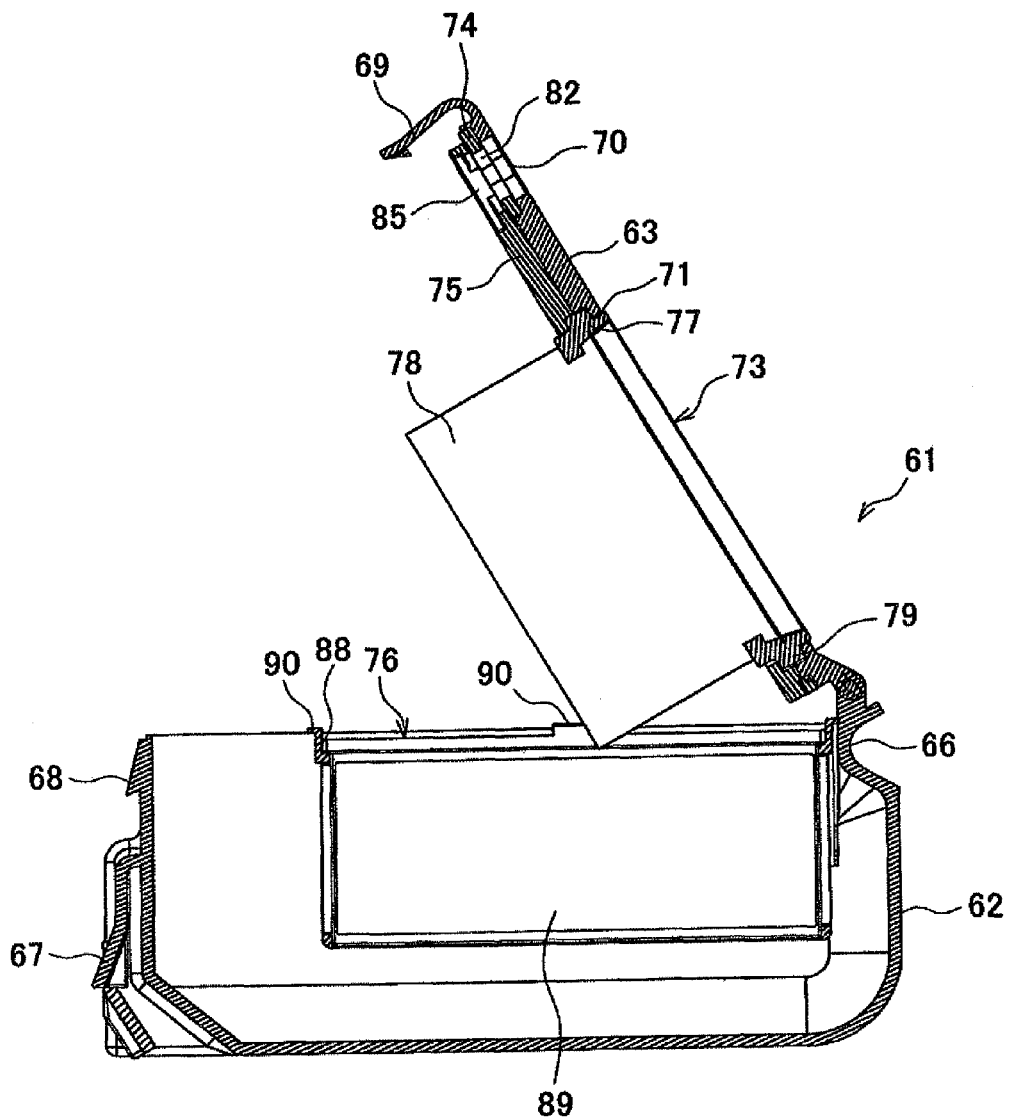
FIG. 9 is a longitudinal sectional view of the dust box with a pre-filter provided on a box body side.

The dust box is not required to be formed in the shape of a horizontally long box. The dust box may be formed in the shape of a square or circular box as long as it can open and close a filter-equipped lid body joined by a hinge. Further, as shown in, for example, FIG. 9, the filter may have the pre-filter 76 attached to the box body 62 side through the engagement of the hook strips 90 with the opening of the box body 62 or the like, instead of being attached to the lid body 63 side. Furthermore, the main filter 73 is used exclusively without the pre-filter 76.

The filter can also be attached to the lid body in an appropriately changed manner by, for example, designing the attachment member simply as a region receiving the frame of the filter from below, or joining the attachment member to the lid body by a hinge. Furthermore, the attachment member may be dispensed with directly attaching the filter to the lid body by, for example, fitting the frame of the filter into the outlet of the lid body.

Further, as for the configuration of the dust collecting device as well, for example, the dust collecting fan may be provided on another shaft to which rotation is transmitted from the output shaft, instead of being provided on the output shaft of the motor. The configurations of other components such as the nozzle and the like can also be appropriately changed in design. Furthermore, the dust collecting device can also be caused to collect powder dust with the aid of the motor on the electric tool side as described in Japanese Patent Application Publication No. JP-A-2008-207361, instead of being provided therein with the dedicated motor or the dust collecting fan.

Besides, the electric tool is not limited to the hammer drill either. The dust collecting device can be mounted to other kinds of tools such as an electric drill, an electric hammer, and the like.

It is explicitly stated that all features disclosed in the description and/or the claims are intended to be disclosed separately and independently from each other for the purpose of original disclosure as well as for the purpose of restricting the claimed invention independent of the composition of the features in the embodiments and/or the claims. It is explicitly stated that all value ranges or indications of groups of entities disclose every possible intermediate value or intermediate entity for the purpose of original disclosure as well as for the purpose of restricting the claimed invention, in particular as limits of value ranges.

What is claimed is:

1. A dust collecting device comprising:
a casing that forms a dust collecting route, through which outside air sucked from a suction port flows, and can be attached to an electric tool; and
a dust box that is removably joined to a joint portion provided on the casing, and is provided therein with a vent channel equipped with a filter and constituting part of the dust collecting route, wherein
the dust box is formed of a box body and a lid body that is joined by a hinge to the box body and can open and close an opening of the box body;
the filter is attached to the lid body; and
the dust box is joined to the joint portion by forming in one of a pair of lateral faces of the box body a recessed groove in which a shaft protrusion formed on the joint portion is fitted, forming on the other lateral face of the box body an engagement strip that elastically engages a permeable hole formed through the joint portion, fitting the shaft protrusion into the recessed groove, and rotating the dust box around the shaft protrusion to engage the engagement strip with the permeable hole.

2. A dust collecting device comprising:
a casing that forms a dust collecting route, through which outside air sucked from a suction port flows, and can be attached to an electric tool; and
a dust box that is removably joined to a joint portion provided on the casing, and is provided therein with a vent channel equipped with a filter and constituting part of the dust collecting route, wherein
the dust box is formed of a box body and a lid body that is joined by a hinge to the box body and can open and close an opening of the box body;
the filter is attached to the lid body;
a duct is provided to constitute the dust collecting route on the casing side and be inserted so as to be connected to the inlet when the dust box is joined to the joint portion, wherein the duct protrudes into the joint portion; and
the lid body has an inlet and an outlet of the vent channel.

3. The dust collecting device according to claim 2, wherein the inlet is provided with a sealing body that seals an entire periphery of the duct when the duct is inserted so as to be connected to the inlet.

4. The dust collecting device according to claim 3, wherein the sealing body is formed integrally with a sealing frame that seals a space between the box body and the lid body when the lid body is closed.

5. The dust collecting device according to claim 2, wherein the casing accommodates a motor, and
the motor has an output shaft provided with a dust collecting fan that is accommodated in an intake chamber communicating with the outlet.

6. The dust collecting device according to claim 5, wherein the casing is provided with a male terminal that is electrically connected to the electric tool to supply power to the motor upon being mounted to the electric tool.

7. The dust collecting device according to claim 6, wherein the casing is provided with a protection rib that protects a root region of the male terminal.

8. An electric tool equipped with a dust collecting device, comprising:
a dust collecting device comprising:
a casing that forms a dust collecting route, through which outside air sucked from a suction port flows, and is configured to be attached to an electric tool; and
a dust box that is removably joined to a joint portion provided on the casing, and is provided therein with a vent channel equipped with a filter and constituting part of the dust collecting route, wherein
the dust box is formed of a box body and a lid body that is joined by a hinge to the box body and can open and close an opening of the box body, and
the filter is removably attached to the lid body, via an attachment member to which the filter is attached, the filter having a protrusion strip adjacent to an upper surface of the filter,
the attachment member is a plate body having a plurality of engagement protrusions that can be inserted and engaged with a plurality of attachment holes provided in the lid body respectively, and
when the plurality of engagement protrusions of the attachment member engage with the plurality of attachment holes of the lid body respectively, the protrusion strip of the filter is sandwiched between the lid body and the attachment member, thereby the filter is attached to the lid body, and
a housing to which the dust collecting device is mounted.

9. The electric tool equipped with the dust collecting device according to claim 8, wherein the housing is formed on a front portion thereof a mounting portion for the dust collecting device.

10. The electric tool equipped with the dust collecting device according to claim 9, wherein the housing is provided with a female terminal that is electrically connected to a male terminal provided on the dust collecting device to supply power to the dust collecting device side when the dust collecting device is mounted to the housing.

11. The electric tool equipped with the dust collecting device according to claim 10, wherein the housing is formed therein a plug-in port exposing the female terminal, and is provided with a shutter that opens the plug-in port when the dust collecting device is mounted to the housing and closes the plug-in port when the dust collecting device is removed from the housing.

12. A dust collecting device comprising:
a casing that forms a dust collecting route, through which outside air sucked from a suction port flows, and is configured to be attached to an electric tool; and
a dust box that is removably joined to a joint portion provided on the casing, and is provided therein with a vent channel equipped with a filter and constituting part of the dust collecting route, wherein
the dust box is formed of a box body and a lid body that is joined by a hinge to the box body and can open and close an opening of the box body, and
the filter is removably attached to the lid body via an attachment member to which the filter is attached, the filter having a protrusion strip adjacent to an upper surface of the filter,
the attachment member is a plate body having a plurality of engagement protrusions that can be inserted and engaged with a plurality of attachment holes provided in the lid body respectively, and
when the plurality of engagement protrusions of the attachment member engage with the plurality of attachment holes of the lid body respectively, the protrusion strip of the filter is sandwiched between the lid body and the attachment member, thereby the filter is attached to the lid body.

* * * * *